US010583538B2

(12) United States Patent
Watford et al.

(10) Patent No.: US 10,583,538 B2
(45) Date of Patent: Mar. 10, 2020

(54) FEED OSCILLATION VIA VARIABLE PITCH GEARS

(71) Applicant: Apex Brands, Inc., Apex, NC (US)

(72) Inventors: Jeremy Dean Watford, Irmo, SC (US); William Carlos Cain, Irmo, SC (US); John Stewart, Lexington, SC (US); John Kirby Mitchell, West Columbia, SC (US); Jodi Ann Bello, Lexington, SC (US)

(73) Assignee: APEX BRANDS, INC., Apex, NC (US)

( * ) Notice: Subject to any disclaimer, the term of this patent is extended or adjusted under 35 U.S.C. 154(b) by 653 days.

(21) Appl. No.: 14/990,042

(22) Filed: Jan. 7, 2016

(65) Prior Publication Data
US 2017/0136590 A1    May 18, 2017

Related U.S. Application Data

(60) Provisional application No. 62/255,772, filed on Nov. 16, 2015.

(51) Int. Cl.
*B23Q 5/32* (2006.01)
*B23B 39/10* (2006.01)
(Continued)

(52) U.S. Cl.
CPC ............. *B23Q 5/32* (2013.01); *B23B 47/34* (2013.01); *B23Q 5/326* (2013.01); *B23Q 5/402* (2013.01);
(Continued)

(58) Field of Classification Search
CPC .......... B23Q 5/32; B23Q 5/326; B23Q 5/402; B23Q 2705/06; B23B 47/34; B23B 2260/07; B23B 39/10
(Continued)

(56) References Cited

U.S. PATENT DOCUMENTS

| 1,675,596 A * | 7/1928 | Bradbury | H03J 1/08 |
| | | | 74/10.8 |
| 1,925,289 A | 9/1933 | Strobel | |

(Continued)

FOREIGN PATENT DOCUMENTS

| DE | 4026264 A1 | 2/1992 |
| DE | 202005008630 U1 | 9/2005 |

(Continued)

OTHER PUBLICATIONS

Drill Chip Breaker, internet article, www.commandermultidrill.com, all enclosed pages cited.
(Continued)

*Primary Examiner* — Nathaniel C Chukwurah
*Assistant Examiner* — Lucas E. A. Palmer
(74) *Attorney, Agent, or Firm* — Burr & Forman, LLP

(57) ABSTRACT

A positive feed tool includes a motor, a power supply coupled to the motor to power the motor, a gear head and a spindle. The gear head is coupled to the motor and operated responsive to powering of the motor. The gear head includes a drive assembly and a feed assembly. The spindle is coupled to the gear head to enable the spindle to be selectively driven rotationally and fed axially based on operation of the drive assembly and the feed assembly, respectively. The feed assembly includes a feed rate oscillator having a spindle feed gear coupled to a differential feed gear. The spindle feed gear is coupled to rotate the spindle to selectively axially feed the spindle. The differential feed gear is selectively coupled to an input shaft turned by the motor. The spindle feed gear or the differential feed gear has a variable pitch diameter.

17 Claims, 6 Drawing Sheets

(51) Int. Cl.
*B23Q 5/40* (2006.01)
*B23B 47/34* (2006.01)

(52) U.S. Cl.
CPC ...... *B23B 2260/07* (2013.01); *B23Q 2705/06* (2013.01)

(58) Field of Classification Search
USPC .......................................................... 173/216
See application file for complete search history.

(56) References Cited

U.S. PATENT DOCUMENTS

| | | | |
|---|---|---|---|
| 2,514,759 A | 7/1950 | Hallden | |
| 2,791,922 A * | 5/1957 | Robinson | B23Q 5/326 173/19 |
| 3,363,700 A | 1/1968 | Bogusch, Jr. | |
| 3,487,729 A * | 1/1970 | Juhasz | B23Q 5/326 408/14 |
| 3,583,822 A * | 6/1971 | Alexander | B23B 45/008 408/11 |
| 4,111,590 A * | 9/1978 | Burkart | B23Q 1/70 408/130 |
| 4,182,588 A * | 1/1980 | Burkart | B23Q 1/70 408/126 |
| 5,022,800 A * | 6/1991 | Vindez | B23Q 5/326 173/19 |
| 5,073,068 A | 12/1991 | Jinkins et al. | |
| 5,143,161 A * | 9/1992 | Vindez | B23G 1/46 173/145 |
| 5,351,797 A * | 10/1994 | Lawson | B23Q 5/326 173/19 |
| 6,231,278 B1 * | 5/2001 | Gehlsen | B23Q 5/326 408/1 R |
| 7,048,077 B2 | 5/2006 | Veres | |
| 7,587,965 B2 | 9/2009 | Mann et al. | |
| 7,882,901 B2 | 2/2011 | Veres | |
| 8,469,641 B2 | 6/2013 | Jaillon | |
| 8,522,941 B1 * | 9/2013 | Eldessouky | B23Q 5/326 192/69.81 |
| 8,696,265 B2 | 4/2014 | Elsmark et al. | |
| 8,721,232 B2 | 5/2014 | Peigne | |
| 2006/0251480 A1 | 11/2006 | Mann et al. | |
| 2007/0209813 A1 | 9/2007 | Veres | |
| 2009/0074525 A1 * | 3/2009 | Jaillon | B23B 47/34 408/132 |
| 2009/0245955 A1 * | 10/2009 | Maillard | B23Q 5/326 408/1 R |
| 2009/0311059 A1 * | 12/2009 | Janson | B23B 35/00 408/126 |
| 2010/0003096 A1 | 1/2010 | Peigne | |
| 2010/0119316 A1 * | 5/2010 | Galand | B23Q 5/326 408/1 R |
| 2011/0064532 A1 * | 3/2011 | Elsmark | B23Q 5/326 408/128 |
| 2013/0051946 A1 | 2/2013 | Peigne | |
| 2013/0126201 A1 * | 5/2013 | Zhang | B23B 39/00 173/217 |
| 2014/0238711 A1 | 8/2014 | Myhill | |
| 2015/0375306 A1 * | 12/2015 | Jallageas | B23Q 5/402 408/67 |

FOREIGN PATENT DOCUMENTS

| | | | | |
|---|---|---|---|---|
| DE | 102005002462 A1 | 7/2006 | | |
| EP | 1500780 A1 | 1/2005 | | |
| EP | 2032294 B1 | 9/2010 | | |
| EP | 1916045 B1 | 4/2013 | | |
| EP | 2501518 B1 | 10/2013 | | |
| FR | 2890581 A1 | 3/2007 | | |
| FR | 2952563 A1 | 5/2011 | | |
| FR | 3002017 A1 | 8/2014 | | |
| GB | 1212475 | 11/1970 | | |
| JP | H03136710 A | 6/1991 | | |
| WO | 2007051839 A1 | 5/2007 | | |
| WO | WO 2007051839 A1 * | 5/2007 | ............ | B23B 35/00 |
| WO | 2008000935 A1 | 1/2008 | | |
| WO | 2013088343 A1 | 6/2013 | | |
| WO | 2014064047 A1 | 5/2014 | | |

OTHER PUBLICATIONS

International Search Report and Written Opinion of PCT/US2016/062178 dated Feb. 28, 2017, all enclosed pages cited.

* cited by examiner

FEED OSCILLATION VIA VARIABLE PITCH GEARS

CROSS REFERENCE TO RELATED APPLICATIONS

The present application claims priority to U.S. patent application No. 62/255,772 filed Nov. 16, 2015, which is expressly incorporated by reference in its entirety.

TECHNICAL FIELD

Example embodiments generally relate to power tools and, in particular, relate to positive feed tools that employ feed rate oscillation.

BACKGROUND

Power tools are commonly used across all aspects of industry and in the homes of consumers. Power tools are employed for multiple applications including, for example, drilling, tightening, sanding, and/or the like. For some drilling and fastening operations, positive feed tools may be preferred. Positive feed tools are often used to perform operations on workpieces such as steel, aluminum, titanium and composites, and may employ a tool feeding mechanism that feeds a bit into the workpiece at a controlled rate. Such tools are common in the aviation industry, and other industries in which precise drilling is needed in metallic workpieces or other hard workpieces.

Drilling holes, and particularly drilling deep holes within workpieces that are hard, using conventional methods can typically produce long drilled chips that are difficult to evacuate from the hole. These long chips are generated because the bit is fed into the workpiece at a constant feed rate (e.g., 0.003 inches per revolution). The constant feed rate means that the chips will have a constant thickness (i.e., 0.003 inches) that leads to a spiral shaped chip forming and growing as the drilling operation proceeds. The chips may end up being multiple hole diameters long, and can cause chip packing. The chips can therefore cause additional torque to be required, and can lead to longer cycle times and poor hole quality.

To address this issue, variation or oscillation of the feed rate may be introduced. By varying the feed rate (e.g., changing the feed rate by 0.001 to 0.005 inches per revolution), the resulting chips will have a variable thickness that alternates between thin and thick sections. This variable thickness will cause the chips to tend to break at the thin sections, and enable the remainder of the chip to be evacuated more easily. This method may be referred to as micro-peck drilling because the cutter (e.g., the bit) stays in the material and is always cutting a chip. If the amplitude is increased to exceed the feed rate, then macro-peck drilling results in which the cutter is actually removed from contact with the material of the workpiece.

Micro-peck drilling methods that are currently employed typically use special thrust bearings that have oscillating cam profiles. However, these special thrust bearings are typically very expensive and have limited life spans.

BRIEF SUMMARY OF SOME EXAMPLES

Some example embodiments may enable the provision of a positive feed tool that employs a different structure to employ micro-peck drilling with an oscillating feed rate. In this regard, some example embodiments may provide a feed rate oscillator that employs variable pitch diameter gears to generate the feed rate oscillation.

In an example embodiment, a positive feed tool is provided. The tool may include a motor, a power supply operably coupled to the motor to power the motor, a gear head and a spindle. The gear head may be operably coupled to the motor to be operated responsive to powering of the motor. The gear head may include a drive assembly and a feed assembly. The spindle may be operably coupled to the gear head to enable the spindle to be selectively driven rotationally and fed axially based on operation of the drive assembly and the feed assembly, respectively. The feed assembly may include a feed rate oscillator having a spindle feed gear operably coupled to a differential feed gear. The spindle feed gear is operably coupled to rotate the spindle to selectively axially feed the spindle. The differential feed gear is selectively operably coupled to an input shaft turned by the motor. At least one of the spindle feed gear or the differential feed gear has a variable pitch diameter.

In another example embodiment, a gear head for selectively driving and feeding a spindle of a positive feed tool is provided. The gear head may include a drive assembly configured to selectively drive the spindle rotationally, and a feed assembly configured to selectively feed the spindle axially. The feed assembly may include a feed rate oscillator having a spindle feed gear operably coupled to a differential feed gear. The spindle feed gear is operably coupled to rotate the spindle to selectively axially feed the spindle. The differential feed gear is selectively operably coupled to an input shaft turned by the motor. At least one of the spindle feed gear or the differential feed gear has a variable pitch diameter.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
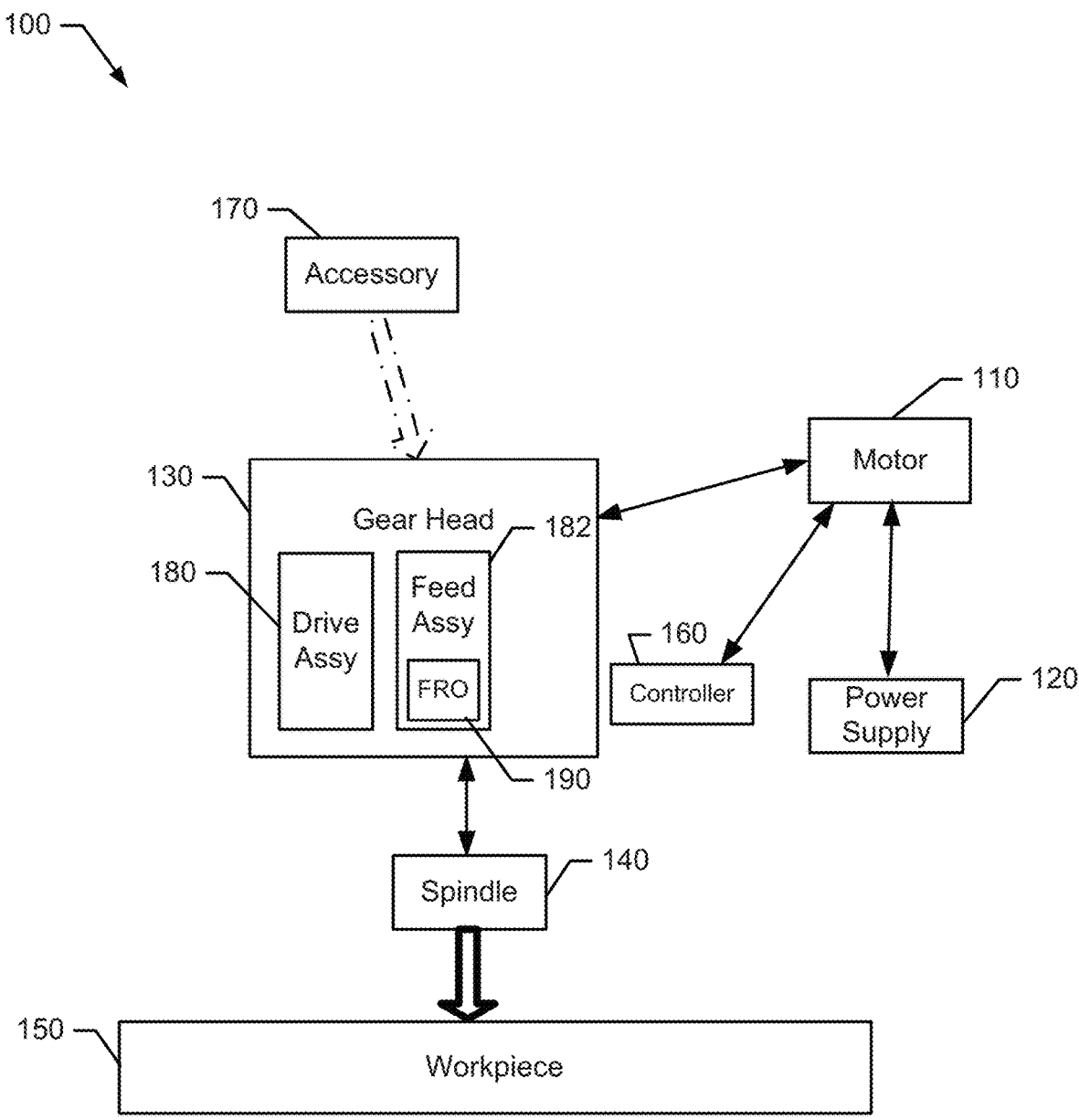
FIG. 1 illustrates a functional block diagram of a positive feed tool that may employ a feed rate oscillator according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of highly capable positive feed tools that also have superior characteristics relative to providing feed rate oscillation. In particular, some example embodiments may provide a positive feed tool having a feed rate oscillator that provides feed rate oscillation so that chip formation can be controlled based on the geometry and structure of the feed rate oscillator provided. Moreover, some example embodiments may provide a feed rate oscillator that employs variable pitch diameter gears. FIG. 1 illustrates a functional block diagram of a positive feed tool that may employ a feed rate oscillator according to an example embodiment.

As shown in FIG. 1, a positive feed tool 100 of an example embodiment may include a motor 110, a power supply 120 and a gear head 130 that is configured to drive a spindle 140. The spindle 140 may be driven to rotate about an axis and also be fed in a direction along the axis of rotation to, for example, power a bit disposed at a distal end of the spindle 140 to drill a hole in a workpiece 150. In some cases, the motor 110 or other components of the positive feed tool 100 may optionally be operated under the control of an optional controller 160. Although not required, the gear head 130 may be fitted or mated with one or more accessories 170 that may augment or otherwise alter various capabilities or aspects of performance of the positive feed tool 100. The accessories 170 may therefore be removable, exchangeable, or otherwise electively employed for operation of the positive feed tool 100.

In some examples, the motor 110 may be a pneumatic motor, and the power supply 120 may therefore be pressurized air. However, in alternative embodiments, the motor 110 may be an electric motor or a hydraulically powered motor, and the power supply 120 would then be battery/mains power or a hydraulic power supply, respectively. Regardless of how the motor 110 is powered, the motor 110 may be operably coupled to the gear head 130 to drive and feed the spindle 140.

In an example embodiment, the motor 110 may be operably coupled to drive the gear head 130 for rotation of the spindle 140 about an axis thereof via a drive assembly 180. In some cases, the spindle 140 may be an elongated member having one or more slots for engagement with a drive gear of the drive assembly 180 to rotate the spindle 140 based on rotation of the drive gear. The spindle 140 may also include threads for engagement with a feed gear of a feed assembly 182 that is configured to feed the spindle 140 in a direction along the axis of the spindle 140 and into (or away from) the workpiece 150. Thus, for example, the drive assembly 180 and the feed assembly 182 may be operably coupled to the motor 110 (and/or each other) to enable selective drive and feeding of the spindle 140.

As mentioned above, if the feed assembly 182 is powered to generate a constant feed rate (e.g., 0.003 inches per revolution), then the spiral shaped chips having a constant thickness will be generated, and various problems could result. Accordingly, to vary the thickness of the chips, and to facilitate breakage and more easy evacuation of the chips, an oscillating feed rate may be employed. To provide the oscillating feed rate, example embodiments may employ a feed rate oscillator 190 (or FRO), which may be operably coupled to or provided as a portion of the feed assembly 182.

As may be appreciated from the description above, the specific components of the gear head 130 can be varied in some cases. An example structure for the gear head 130 will be described in reference to FIG. 2. However, other specific structures can be employed to embody portions of the gear head 130 in some alternative embodiments. The structure employed for certain portions of the gear head 130 may then impact corresponding structures employed for the feed rate oscillator 190.

Figure 2:
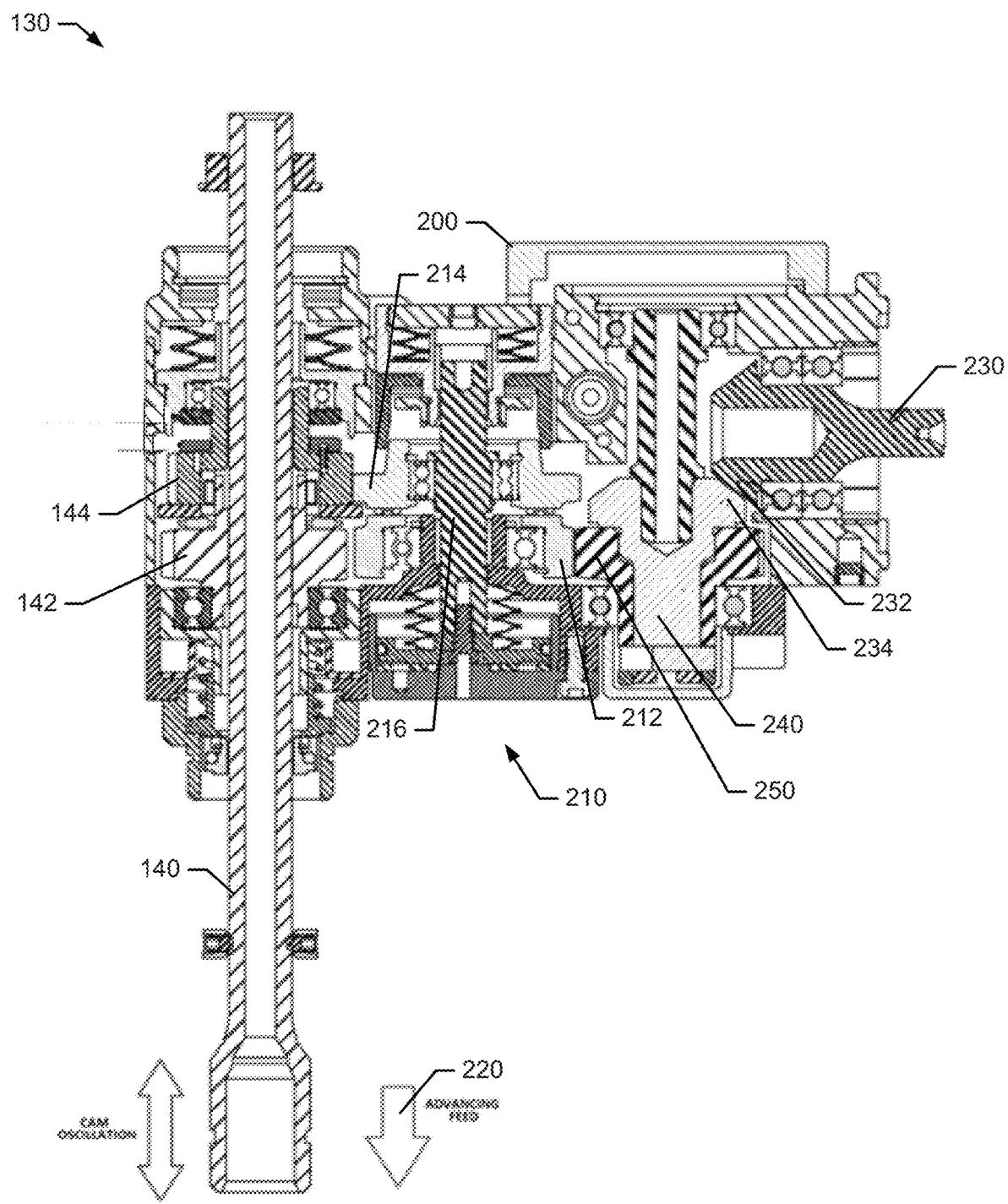
FIG. 2 illustrates a cross section view of a positive feed tool having a feed rate oscillator according to an example embodiment.

Referring now to FIG. 2, the gear head 130 may include a casing or housing 200 inside which various components of the drive assembly 180 and the feed assembly 182 may be housed. The motor 110 may be operably coupled to the spindle 140 via a differential unit 210. The differential unit 210 may include a differential drive gear 212 and a differential feed gear 214 that may engage a spindle drive gear 142 and spindle feed gear 144, respectively. The spindle drive gear 142 and spindle feed gear 144 may each be operably coupled to the spindle 140 to selectively provide drive and feed for the spindle 140. Meanwhile, the differential drive gear 212 and the differential feed gear 214 may each be operably coupled to a feed shaft 216.

In an example embodiment, the spindle 140 may include one or more slots for engagement with the spindle drive gear 142 and threads for engagement with the spindle feed gear 144. The spindle drive gear 142 and spindle feed gear 144 may each also have a generally annular shape with a central opening to receive the spindle 140. Internal threads provided on the spindle feed gear 144 may engage external threads along the length of the spindle 140 so that when the spindle feed gear 144 is rotated in relation to the spindle 140, the spindle 140 will feed in an advancing feed direction shown by arrow 220.

The differential drive gear 212 and the differential feed gear 214 each extend around the feed shaft 216 and include gear teeth for engagement with respective ones of the spindle drive gear 142 and spindle feed gear 144. The differential feed gear 214 is operably coupled to the feed shaft 216 to move axially with the feed shaft 216. The differential drive gear 212 is operably coupled to the feed shaft 216, but does not move axially with the feed shaft 216, instead having a central opening through which the feed shaft 216 slides.

When the motor 110 operates, an input shaft 230 is turned. A set of bevel gears 232/234 then translates the rotation of the input shaft 230 to input gear 240. Another gear 250 is operably coupled to the input gear 240. The input gear 240 is operably coupled to the differential unit 210 (e.g., via the differential drive gear 212. The differential drive gear 212 and the differential feed gear 214 may be selectively operably coupled to each other to cause the differential feed gear 214 to either rotate with the differential drive gear 212 (e.g., when the differential drive gear 212 and the differential feed gear 214 are engaged) or not rotate with the differential drive gear 212 (e.g., when the differential drive gear 212 and the differential feed gear 214 are not engaged). The spindle drive gear 142 will generally be driven by the differential drive gear 212 when the motor 110 operates and rotate the spindle 140. However, the spindle feed gear 144 is only driven when the differential feed gear 214 is engaged with the differential drive gear 212. When the differential feed gear 214 is disengaged from the differential drive gear 212, both the differential feed gear 214 and the spindle feed gear 144 become stationary. The rotation of the spindle 140 while the spindle feed gear 144 is stationary then resultantly causes the spindle 140 to be withdrawn and move in a direction opposite the advancing feed direction shown by arrow 220.

In a typical configuration, the feed rate generated by the operation described above would be a constant feed rate (e.g., of about 0.003 inches per revolution). Similarly, in some typical configurations, the differential feed gear 214 and/or the spindle feed gear 144 may each have a round, and perhaps cylindrical, profile so that the constant feed rate is maintained. However, in accordance with an example embodiment, the feed gear pitch diameter of one or both of the differential feed gear 214 and the spindle feed gear 144 can be modified over at least a portion thereof in order to change the feed rate from the constant feed rate to an oscillating feed rate. In some cases, the pitch diameter of the differential feed gear 214 and/or the spindle feed gear 144 can be modified to change the ratio of the gears as they rotate to provide the oscillating feed rate. Thus, in accordance with an example embodiment, the feed rate oscillator 190 of FIG. 1 may be embodied in the differential feed gear 214 and/or the spindle feed gear 144 and the structural modifications employed on the differential feed gear 214 and/or the spindle feed gear 144 to produce the variations in pitch diameter.

The pitch diameter of the differential feed gear 214 and/or the spindle feed gear 144 can be varied by multiple different methods. One example method may include employment of non-circular gears. For example, each of the differential feed gear 214 and the spindle feed gear 144 may be formed as non-circular feed gears to result in a changing gear ratio as the gears rotate. An alternative example method may employ circular gears with profile modifications over a prescribed portion of such gears to create a changing pitch diameter and gear ratio as the gears rotate. Still another alternative method may include a combination of employing non-circular gears and profile modifications for changing pitch diameter. In some cases, this combined approach may generate opportunities for improved performance and adjustability.

Figure 3A:
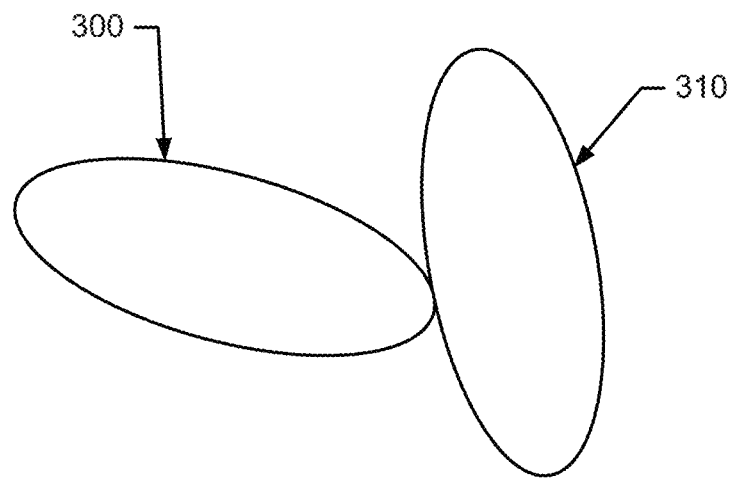
FIG. 3A illustrates a top view of the feed rate oscillator having non-circular gears in accordance with an example embodiment.
Figure 3B:
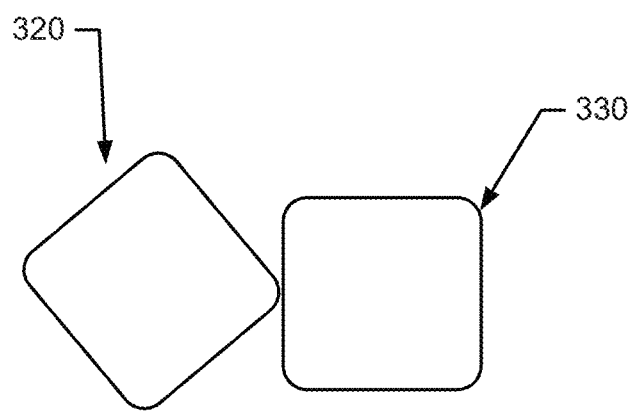
FIG. 3B illustrates a top view of the feed rate oscillator having alternatively shaped, non-circular gears in accordance with an example embodiment.

In accordance with the first example described above, both the spindle feed gear 144 and the differential feed gear 214 may be non-circular. FIG. 3A illustrates an example in which a top view of a non-circular spindle feed gear 300 and a non-circular differential feed gear 310 are employed. As can be appreciated from FIG. 3A, the non-circular spindle feed gear 300 and the non-circular differential feed gear 310 each have an oval shape in this example. Feed rate, amplitude and frequency can be changed by changing the shapes of one or both gears. As an example of another shape that could be employed, FIG. 3B shows a rectangular spindle feed gear 320 and a rectangular differential feed gear 330. Again, the feed rate, amplitude and frequency can be changed by changing the shapes of one or both gears. Mixed shapes could also be employed between the spindle feed gear 144 and the differential feed gear 214.

As described above in reference to the first alternative method in which pitch diameter changes are achieved by profile modifications, one or both feed gears may be modified to have varying pitch diameters. Provision of varying pitch diameters may be accomplished by performing tooth profile modification on one or both feed gears. In one embodiment, the spindle feed gear 144 may be provided with an oscillating gear tooth profile and the differential feed gear 214 may be provided with a constant tooth profile. In other words, the density of teeth around the periphery of the differential feed gear 214 may be consistent about the entire periphery of the differential feed gear 214. However, the density of teeth around the periphery of the spindle feed gear 144 may change with a cyclic increase and decrease in density being provided as the periphery of the spindle feed gear 144 is traversed. Of course, in another example embodiment, this approach may be reversed and the spindle feed gear 144 may have a constant tooth profile while the differential feed gear 214 has the oscillating gear tooth profile. In still another example embodiment, both the spindle feed gear 144 and the differential feed gear 214 to have oscillating tooth profiles.

Figure 4A:
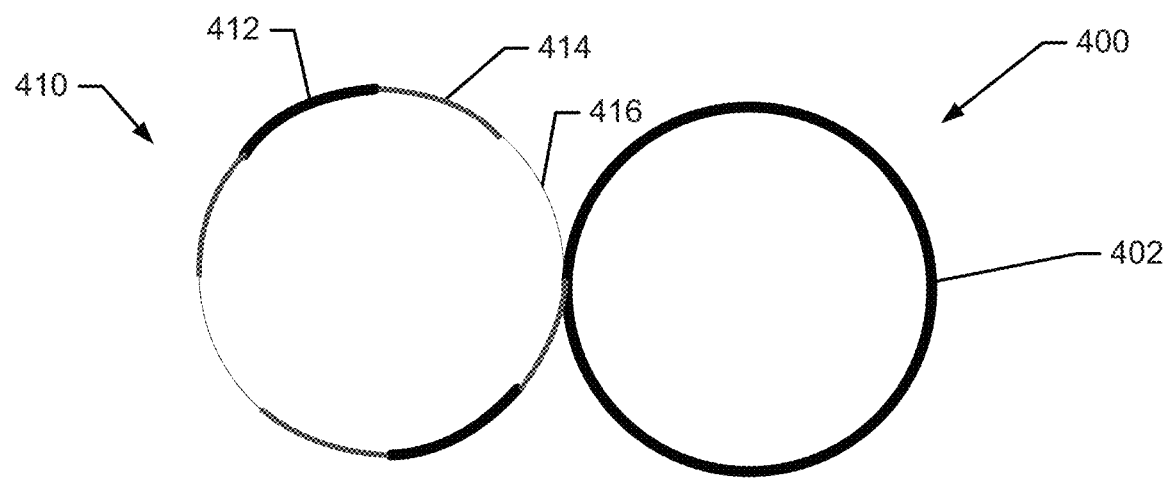
FIG. 4A illustrates a top view of gears with tooth profile modification in accordance with an example embodiment.

FIG. 4A illustrates an example representation of a differential feed gear 400 with a constant tooth profile in which a region 402 having a first tooth density extends around the entire periphery of the differential feed gear 400. Meanwhile, a spindle feed gear 410 is provided having an oscillating tooth profile by virtue of the fact that a first region 412 has a higher tooth density than a second region 414, which has a higher tooth density than a third region 416. The first, second and third regions 412, 414 and 416 may alternate around the periphery of the spindle feed gear 410.

Figure 4B:
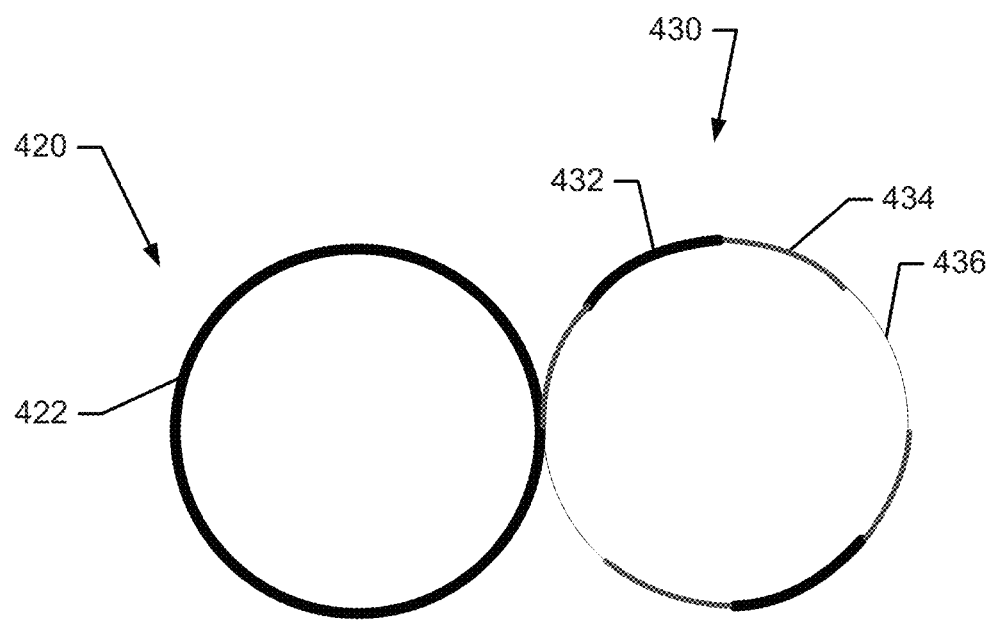
FIG. 4B illustrates a top view of gears with tooth profile modification in accordance with an alternative example embodiment.

FIG. 4B illustrates a reverse of the situation described in FIG. 4A. In this regard, a spindle feed gear 420 is provided with a constant tooth profile in which a region 422 having a predefined tooth density extends around the entire periphery of the spindle feed gear 420. Meanwhile, a differential feed gear 430 is provided having an oscillating tooth profile by virtue of the fact that a first region 432 has a higher tooth density than a second region 434, which has a higher tooth density than a third region 436. The first, second and third regions 432, 434 and 436 may alternate around the periphery of the differential feed gear 430.

In the examples of FIGS. 3A, 3B, 4A and 4B, one or both of the gears may be replaced to change feed rate, frequency, or amplitude. As such, in some cases, the gears may be examples of the accessory 170, and the operator may employ gears having the desired characteristics to achieve feed rate oscillation that is preferred for a given material or situation.

In example embodiments in which any of various combinations of the examples of FIGS. 3A, 3B, 4A and 4B are employed, one or both gears must be replaced to adjust feed rate and frequency; however, the amplitude is dependent on the timing between the two gears. The amplitude can be adjusted by changing which teeth are mating. For example, if the peak of one gear is meshed with the valley of the other gear, the resulting wave may be similar to curve 500 in FIG. 5. If those same two gears are installed so that the peaks of both gears are meshed the resulting wave may be similar to curve 510 in FIG. 5.

Figure 5:
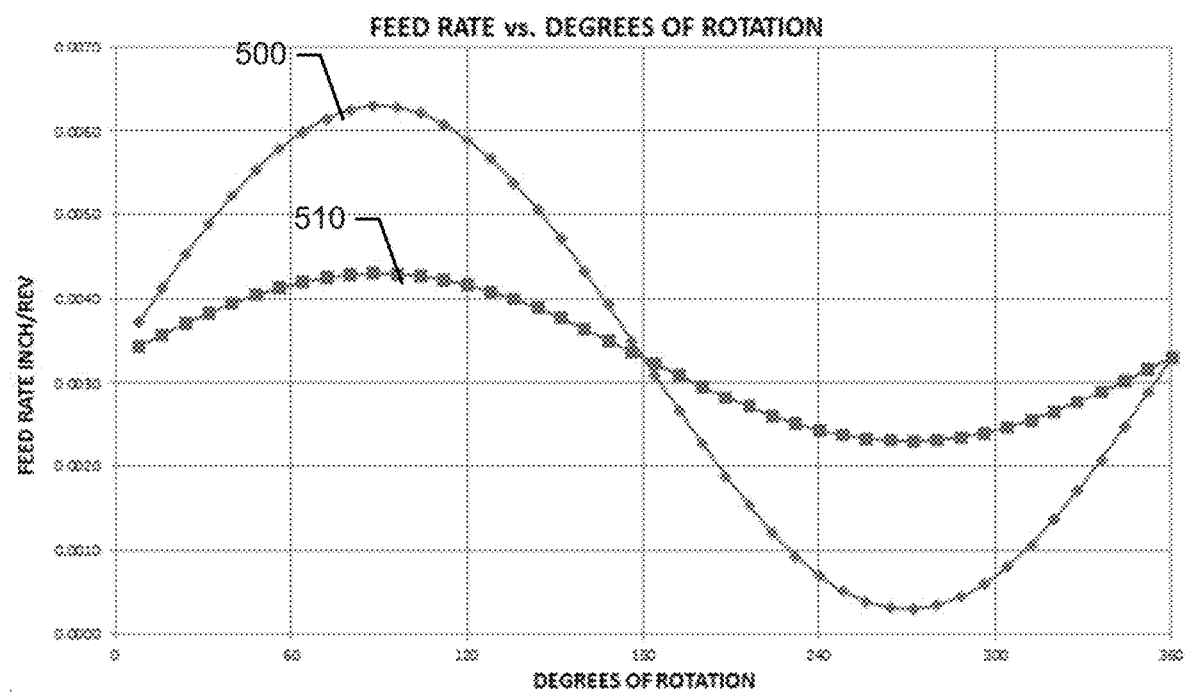
FIG. 5 illustrates a comparison of change in feed rate versus degrees of rotation in accordance with two example embodiments.

The chart of FIG. 5 shows two example amplitudes, but there are multiple amplitudes in between these. Each time the gear mesh is shifted one tooth, the amplitude changes slightly. Therefore, the limiting factor on number of adjustments is determined by the number of teeth in the gear. This provides a very high level of amplitude adjustability, and such adjustability provides for a fine level of detail that can be achieved for adjustability (i.e., down to the individual tooth level). This adjustability and the capability for "tuning" the oscillation amplitude may provide advantages for dealing with different levels of stiffness of the attachment nose, material being drilled, mounting fixture, cutter, etc.

While the feed rate varies during a single rotation of one of the gears, the averaged feed rate remains constant (e.g. 0.003") throughout the process. The number of oscillations per revolution can be one, two, three, four, or as high as the number of teeth and gear size will allow. This method can also be used to make intermediate ratios such as 1.5, 2.5, 3.5 etc. oscillations per revolution. Although the pitch diameters of belt pulleys, chain sprockets, and other similar transmissions can also be varied to accomplish the same task without the use of gearing, variable pitch drive gears can be utilized to perform this oscillation in example embodiments. However, due to the resulting speed oscillation, varying the feed gears may be appreciated as one example way to accomplish variable pitch diameters.

Figure 6A:
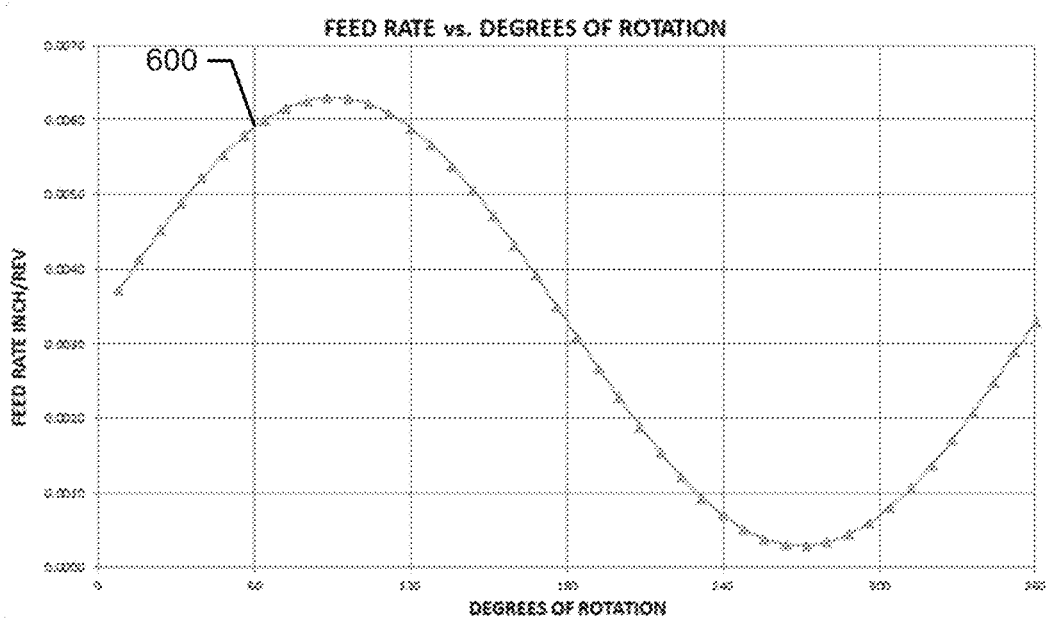
FIG. 6A shows a feed profile with a first frequency in accordance with an alternative example embodiment.
Figure 6B:
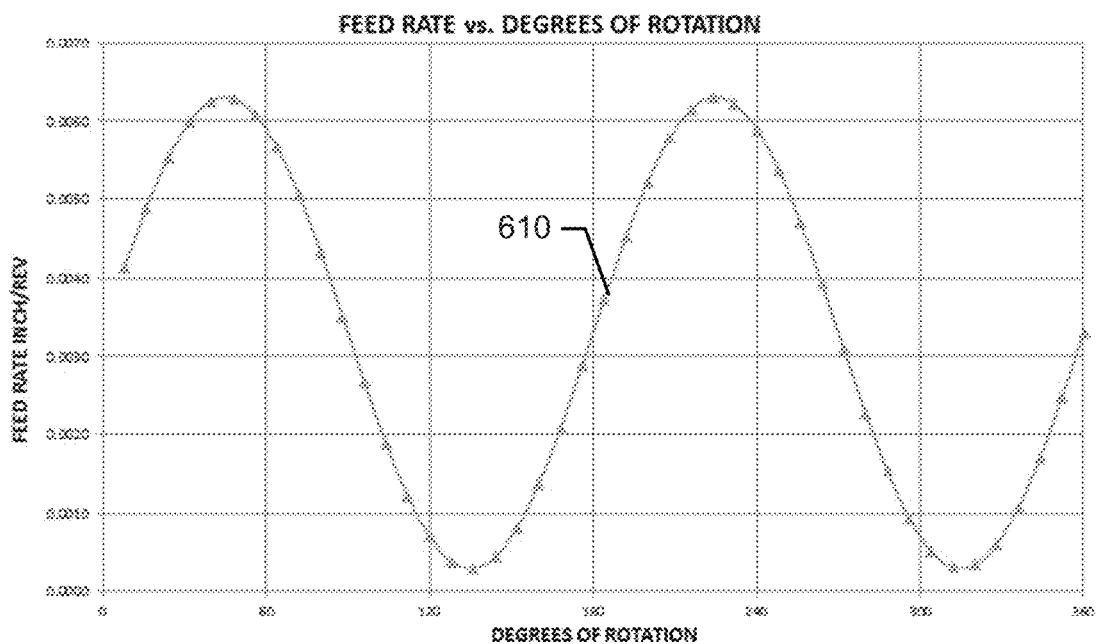
FIG. 6B shows a feed profile with a second frequency in accordance with an alternative example embodiment.
Figure 6C:
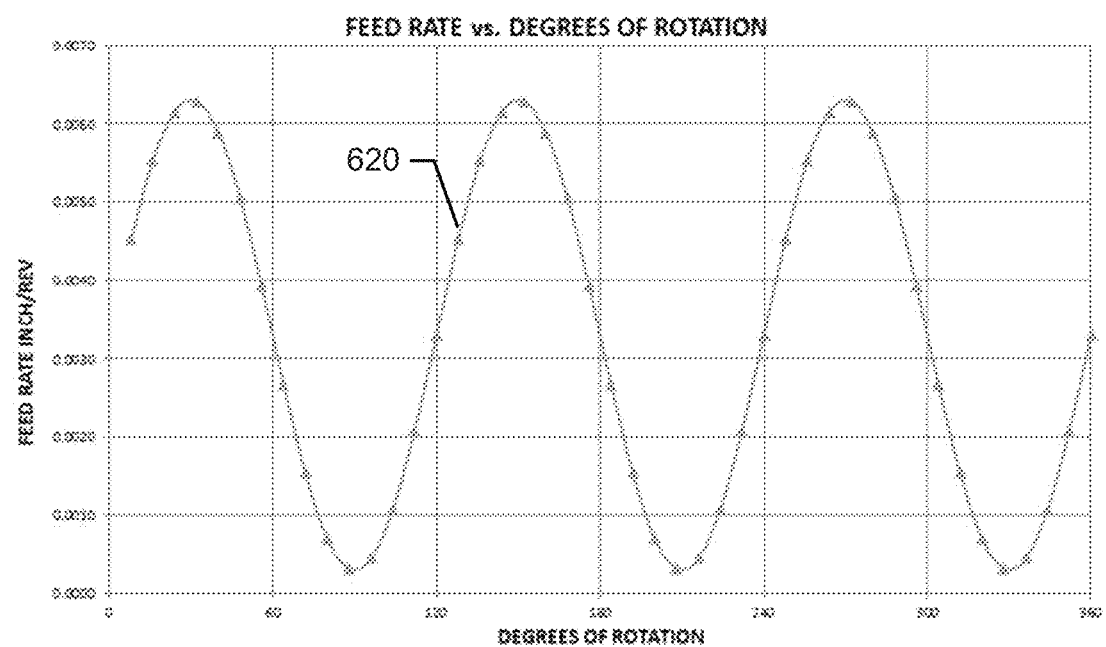
FIG. 6C shows a feed profile with a third frequency in accordance with an alternative example embodiment.

FIG. 6, which includes FIGS. 6A, 6B and 6C, illustrates three charts showing examples of different oscillations per revolution. In this regard, FIG. 6A shows a feed profile 600 with an average feed rate of 0.0033 inches per revolution, amplitude of 0.006 inches, and a frequency of 1.0. FIG. 6B shows a feed profile 610 with an average feed rate of 0.0033 inches per revolution, an amplitude of 0.006 inches, and a frequency of 2.0. FIG. 6C shows a feed profile 620 with an average feed rate of 0.0033 inches per revolution, an amplitude of 0.006 inches, and a frequency of 3.0. An oscillation of one per revolution, as shown in FIG. 6A, can therefore result in a chip that is one diameter long. Two oscillations per revolution, as shown in FIG. 6B, may create chips one-half a diameter long. Three oscillations per revolution, as shown in FIG. 6C, may create chips one-third of a diameter long, etc. In these examples, the frequency changes but the feed rate and the amplitude remain constant.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A positive feed tool comprising:
a motor;
a power supply operably coupled to the motor to power the motor;
a gear head operably coupled to the motor to be operated responsive to powering of the motor, the gear head comprising a drive assembly and a feed assembly; and
a spindle operably coupled to the gear head to enable the spindle to be selectively driven rotationally and fed axially based on operation of the drive assembly and the feed assembly, respectively;
wherein the feed assembly comprises a feed rate oscillator comprising a spindle feed gear coupled to a differential feed gear, the spindle feed gear being carried on the spindle to rotate the spindle to selectively axially feed the spindle, the differential feed gear being carried on a feed shaft and being selectively operably coupled to an input shaft turned by the motor;
wherein at least one of the spindle feed gear or the differential feed gear is a variable pitch diameter gear having a variable pitch diameter;
wherein the variable pitch diameter gear includes an oscillating gear tooth profile to provide the variable pitch diameter, the oscillating gear tooth profile comprising a plurality of regions, each region having a first tooth density, a second tooth density, or a third tooth density and the regions being disposed around a periphery of the variable pitch diameter gear in accordance with a tooth density pattern, wherein the first tooth density is greater than the second tooth density and the second tooth density is greater than the third tooth density, and
wherein the tooth density pattern defines a repeating sequence of adjacent regions having the second tooth density adjacent to the first tooth density adjacent to the second tooth density adjacent to the third tooth density.

2. The positive feed tool of claim 1, wherein the spindle feed gear or the differential feed gear is a non-circular gear.

3. The positive feed tool of claim 1, wherein the spindle feed gear and the differential feed gear each include non-circular gears.

4. The positive feed tool of claim 1, wherein the spindle feed gear and the differential feed gear each include the oscillating gear tooth profile.

5. The positive feed tool of claim 1, wherein the spindle feed gear and the differential feed gear each include an oscillating gear tooth profile and are non-circular gears.

6. The positive feed tool of claim 1, wherein feed rate oscillation provided by the feed rate oscillator is tunable by an operator of the positive feed tool.

7. The positive feed tool of claim 6, wherein an amplitude of the feed rate oscillation is adjustable by adjusting an alignment of teeth between the spindle feed gear and the differential feed gear.

8. The positive feed tool of claim 1, wherein the spindle feed gear or the differential feed gear is replaceable to alter feed rate, frequency or amplitude.

9. The positive feed tool of claim 1, wherein a number of oscillations per revolution is adjustable by changing gear size or tooth profile.

10. A gear head for selectively driving and feeding a spindle of a positive feed tool, the gear head comprising:
a drive assembly configured to selectively drive the spindle rotationally; and
a feed assembly configured to selectively feed the spindle axially;

wherein the feed assembly comprises a feed rate oscillator comprising a spindle teed gear coupled to a differential feed gear, the spindle feed gear being carried on the spindle to rotate the spindle to selectively axially feed the spindle, the differential feed gear being carried on a feed shaft and being selectively operably coupled to an input shaft turned by the motor;

wherein at least one of the spindle feed gear or the differential feed gear is a variable pitch diameter gear having a variable pitch diameter;

wherein the variable pitch diameter gear includes an oscillating gear tooth profile to provide the variable pitch diameter, the oscillating gear tooth profile comprising a plurality of regions, each region having a first tooth density, a second tooth density, or a third tooth density and the regions being disposed around a periphery of the variable pitch diameter gear in accordance with a tooth density pattern, wherein the first tooth density is greater than the second tooth density and the second tooth density is greater than the third tooth density, and wherein the tooth density pattern defines a repeating sequence of adjacent regions having the second tooth density adjacent to the first tooth density adjacent to the second tooth density adjacent to the third tooth density.

11. The gear head of claim 10, wherein the spindle feed gear or the differential feed gear is a non-circular gear.

12. The gear head of claim 10, wherein the spindle feed gear and the differential feed gear each include non-circular gears.

13. The gear head of claim 10, wherein the spindle feed gear and the differential feed gear each include the oscillating gear tooth profile.

14. The gear head of claim 10, wherein the spindle feed gear and the differential feed gear each include the oscillating gear tooth profile and are non-circular gears.

15. The gear head of claim 10, wherein feed rate oscillation provided by the feed rate oscillator is tunable by an operator of the positive feed tool.

16. The gear head of claim 10,
wherein maximum amplitude of the feed rate of the spindle is adjustable by reinstalling one of the spindle feed gear or the differential feed gear in an adjusted alignment with the other of the spindle feed gear and the differential feed gear.

17. The gear head of claim 10, wherein a number of oscillations per revolution is adjustable by changing gear size or tooth profile.

* * * * *